United States Patent
Gupta et al.

(10) Patent No.: US 8,717,498 B2
(45) Date of Patent: May 6, 2014

(54) SYSTEMS AND METHODS FOR MOVING OBJECTS IN VIDEO BY GENERATING AND USING KEYFRAMES

(75) Inventors: Amit Gupta, Noida (IN); Anuji Dhawan, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1205 days.

(21) Appl. No.: 12/542,200

(22) Filed: Aug. 17, 2009

(65) Prior Publication Data

US 2013/0329129 A1    Dec. 12, 2013

(51) Int. Cl.
*H04N 7/12* (2006.01)
(52) U.S. Cl.
USPC ........ 348/416.1; 348/699; 348/700; 348/169; 348/135; 382/103
(58) Field of Classification Search
USPC .......................................... 348/700
See application file for complete search history.

(56) References Cited

U.S. PATENT DOCUMENTS

| | | | | |
|---|---|---|---|---|
| 6,137,544 A | * | 10/2000 | Dimitrova et al. | 348/700 |
| 6,389,168 B2 | * | 5/2002 | Altunbasak et al. | 382/224 |
| 2006/0210175 A1 | * | 9/2006 | Huang et al. | 382/232 |
| 2008/0170751 A1 | * | 7/2008 | Lei et al. | 382/103 |
| 2009/0257623 A1 | * | 10/2009 | Tang et al. | 382/107 |
| 2010/0045799 A1 | * | 2/2010 | Lei et al. | 348/169 |

\* cited by examiner

*Primary Examiner* — Jay Patel
*Assistant Examiner* — Jessica Prince
(74) *Attorney, Agent, or Firm* — Kilpatrick Townsend & Stockton LLP (57) ABSTRACT

Systems and methods for moving objects in a video using keyframes. An object may be added to a video and then defined to move in the video, for example, based on the movement of another video object for which movement is known or determinable. As an example, a video editing interface may receive a new object added at a position on a first frame of a video and a command to associate movement of the added object with the movement of a video object, such as a person that is shown walking in the video. In response, keyframe positions for the added object may be determined for subsequent frames preserving the added object's position relative to the person. The use of those keyframes is optimized. For example, the keyframes may be analyzed to eliminate intermediate keyframes with values that can be interpolated from other keyframes.

13 Claims, 4 Drawing Sheets

SYSTEMS AND METHODS FOR MOVING OBJECTS IN VIDEO BY GENERATING AND USING KEYFRAMES

FIELD

This disclosure generally relates to computer software that runs, displays, provides, or otherwise uses video, digital animation, and other types of electronic content.

BACKGROUND

Various types of video and electronic content present content that changes over time. Video, for example, typically consists of a series of frames that are played or otherwise displayed one after another. People, animals, automobiles, buildings, background, and other objects can appear on multiple frames of a video. For example, a person may appear to walk along a street from one side of a video to the other over the course of the video. More specifically, in the first frame of the video, the person may appear in a position at the far left of the displayed content, in the next frame the person may appear slightly to the right of its position in the prior frame, etc. Generally, the person may appear different in the various frames of the video. For example, as the person walks, the person's arms may swing back and forth and the person's body orientation may change.

Video editing environments allow video to be edited in various ways. Video editing environments, for example, may allow the addition of a border, title, animation, or other new object to a video. However, to add such objects in multiple frames of a video, a developer may be required to work with the individual frames of the video. For example, if a developer wishes to add a speech bubble that moves with a person in a video, the developer may have to reposition the speech bubble in each frame of the video as the person moves around. Alternatively, in a video editing environment, movement of an added object may be associated with the movement of one of the video's objects. However, such automation may result in excessive computation and undesirable movement of the added object. For example, the movement of the added object may not appear smooth. Generally, improved techniques for creating and using moving objects in video and similar electronic content are needed.

SUMMARY

Systems and methods are disclosed for moving objects in a video using keyframes. One exemplary embodiment comprises identifying a first object for use in editing a video and identifying that movement of the first object is based at least in part on movement of a second object in the video. The method further involves determining a first set of keyframe values for positions of the first object in frames of the video based at least in part on the movement of the second object. The first set of keyframe values thus specifies a movement of the first object in the video. The method further involves identifying a reduced set of keyframes that specify the movement of the first object within an error threshold. This may, for example, involve eliminating intermediate keyframes having position values that can be interpolated from other keyframes. As a specific example, an intermediate keyframe can be eliminated if it is determined that a position value of the intermediate keyframe for the first object can be interpolated using a prior keyframe value and a later keyframe value. Once the amount of keyframes has been optimized or otherwise reduced, the method can then provide the video with the first object for display on a computing device.

Another exemplary embodiment comprises similarly identifying that movement of a first object in a video is based at least in part on movement of a second object in the video. This exemplary method further involves identifying at least one frame for which a position value of the first object or a position value of the second object can be interpolated using a position value in a previous frame and a position value in a later frame. The method then identifies keyframes specifying the movement of the first object. The identified keyframes exclude the at least one frame for which the position of the first object or second object can be interpolated. Once an appropriate collection of keyframes is identified, the method can involve providing the video with the first object for display on a computing device.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Systems and methods are disclosed for moving objects in video, digital animation, or similar electronic content (collectively referred to herein as simply video) using keyframes. An object may be added to a video and then defined to move in the video, for example, based on the movement of another video object for which movement is known or determinable. As an example, a video editing interface may receive a new object added at a position on a first frame of a video and a command to associate movement of the added object with the movement of a video object, such as a person that is shown walking in the video. In response, keyframe positions for the added object may be determined for subsequent frames preserving the added object's position relative to the person. The use of those keyframes is then optimized or otherwise improved. For example, the keyframes may be analyzed to eliminate intermediate keyframes with values that can be interpolated from other keyframes.

These illustrative examples are given to introduce the reader to the general subject matter discussed herein and are not intended to limit the scope of the disclosed concepts. The following sections describe various additional embodiments and examples.

Illustrative Computing Environment

Figure 1:
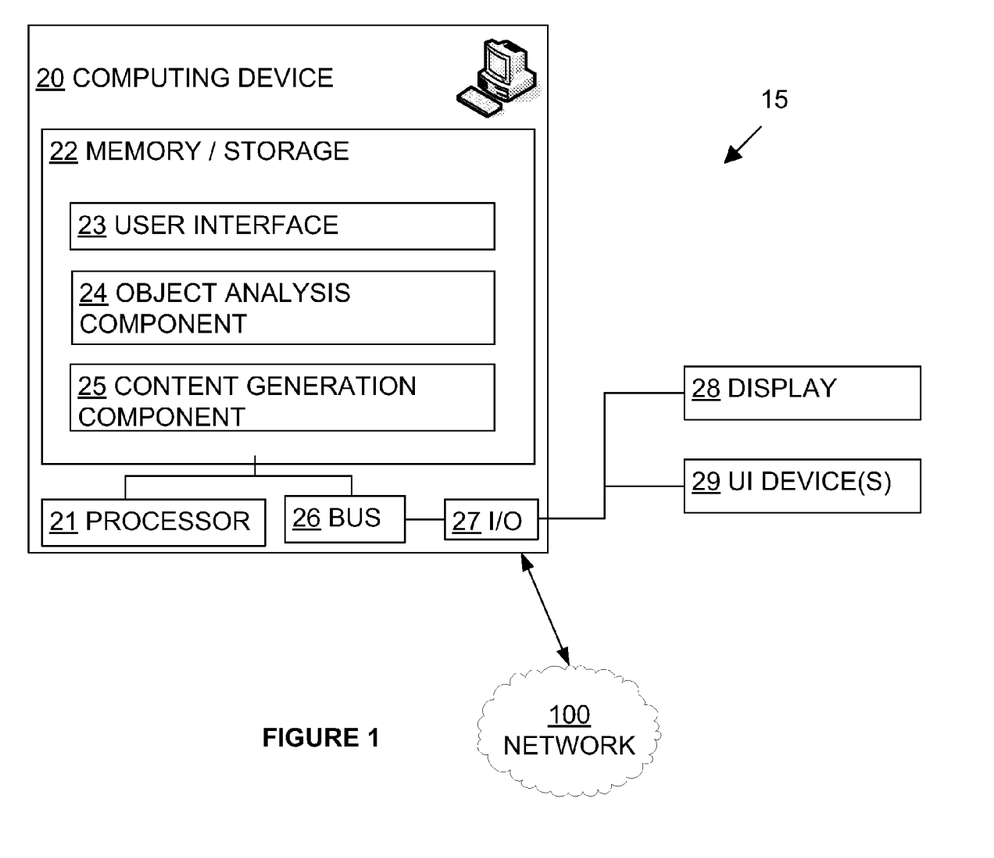
FIG. 1 is a system diagram illustrating an illustrative computing environment.

Referring now to the drawings in which like numerals indicate like elements throughout the several Figures, FIG. 1 is a system diagram illustrating an illustrative computing environment 5 according to certain embodiments. Other embodiments may be utilized. The computing environment 5 comprises a computing device 10 that is connected to a wired or wireless network 100. Exemplary applications that execute on the computing device 10 are shown as functional or storage components residing in memory 12. The memory 12 may be transient or persistent. As is known to one of skill in the art, such applications may be resident in any suitable computer-readable medium and execute on any suitable processor. For example, the computing device 10 may comprise a computer-readable medium such as a random access memory (RAM) coupled to a processor 11 that executes computer-executable program instructions and/or accesses information stored in memory 12. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 100 shown comprises the Internet. In other embodiments, other networks, intranets, combinations of networks, or no network may be used. The computing device 10 may also comprise a number of external or internal devices such as a mouse, a CD-ROM, DVD, a keyboard, a display, audio speakers, or other input or output devices. For example, the computing device 10 includes input/output connections 17, connecting a display 18 and various user interface devices 19. The computer device 10, depicted as a single computer system, may be implemented as a network of computers, servers, or processors. Examples of a server device are servers, mainframe computers, networked computers, a processor-based device, and similar types of systems and devices.

A computing device, such as exemplary computing device 10, can utilize various functional components to implement one or more of the features described herein. Computing device 10 has a user interface 13 for receiving (and possibly displaying) videos and other electronic content. Computing device 10 may further have an object analysis component 14 for associating the motion of an object, such as an object added to a video, with the motion of one or more video objects. The object analysis component 14 may determine and/or optimize the motion of the associated objects. For example, the object analysis component 14 may determine a reduced number of keyframe values specifying the positions of the associated object in some frames of the video while allowing or providing that the positions of the associated object be interpolated for other frames of the video.

In circumstances in which content is generated comprising edited videos, computing device 10 may further have a content generation component 15 that provides the video and/or other combined content objects, for example, by providing such content in a computer readable medium defining the content. The content can be provided, for example, for display on computing device 10 and/or other electronic devices. Accordingly, one aspect of certain embodiments is facilitating the creation of electronic content that includes video that is combined with other objects or effects in a video editing environment.

This illustrative computing environment 5 is provided merely to illustrate a potential environment that can be used to implement certain embodiments. Other computing devices and configurations may alternatively or additionally be utilized.

Exemplary Methods For Moving an Object in a Video Using Keyframes

Figure 2:
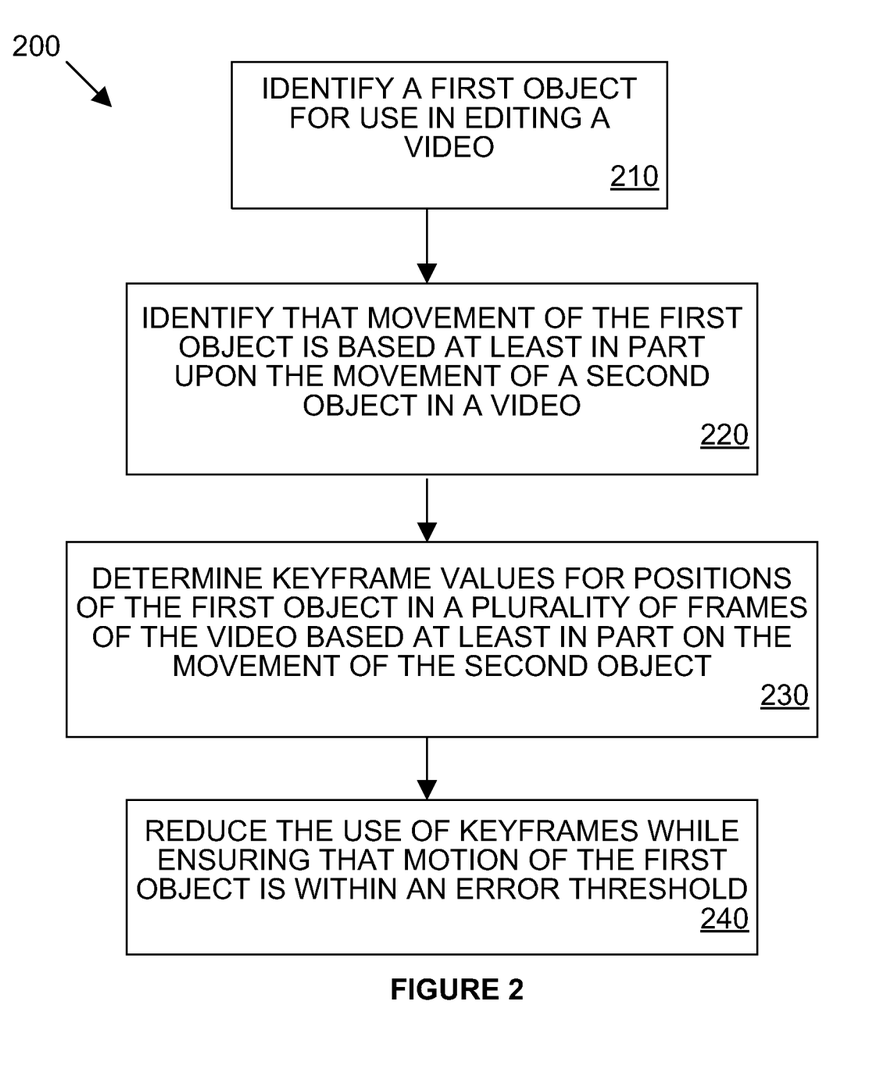
FIG. 2 is a flow chart illustrating an exemplary method of moving an object in a video using keyframes.
Figure 3A:
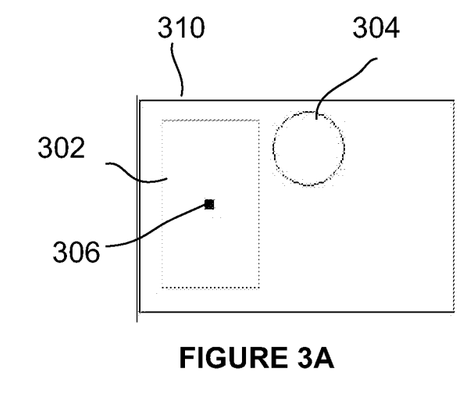
FIGS. 3A-E illustrate the movement of an added object in various frames of an exemplary video.
Figure 3B:
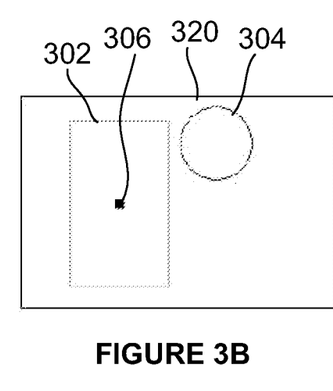
Figure 3C:
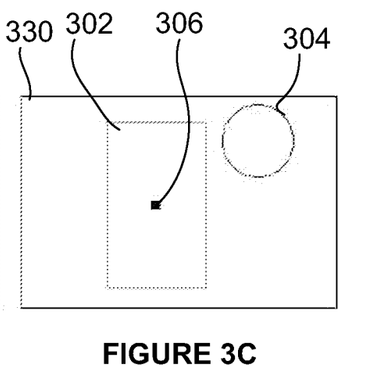
Figure 3D:
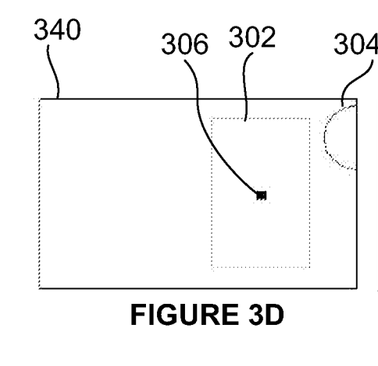
Figure 3E:
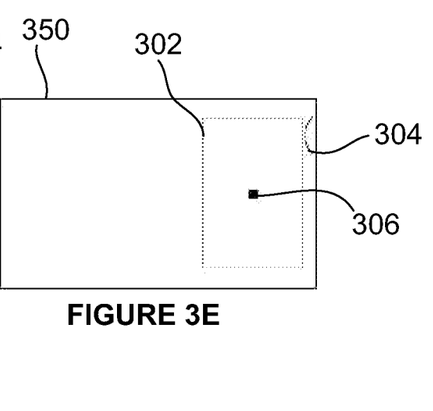

FIG. 2 is a flow chart illustrating an exemplary method 200 of moving a objects in a video using keyframes. The exemplary method 200 involves identifying a first object for use in editing a video, as illustrated in block 210. For example, a new object may be created and added to a video in a video editing environment, such as one that could be provided by the user interface 23 of the computing device 20 of FIG. 1. An object can generally be any graphically displayed line, shape, figure, image, photograph, effect, or other item or component, including any of the variety of containers, components, and other objects that are used in rich Internet application (RIA) development environment including but not limited to Adobe® Flash Professional® and Adobe® Flash Builder®, as examples. An object may or may not have one or more defined boundaries, colors, subparts, and/or fields. An object may be defined as something that is static or as something that changes over time.

Moreover, a video editing environment may be provided as a part of a content development environment that allows a video to be included as part of a larger piece of content and modified within the environment. An object that is used with a video can be, but need not necessarily be, used entirely within the video to which it is added or is otherwise used. Additionally, a single object may be used with one or more videos, including but not limited to single videos, videos that are combined or used sequentially, among other circumstances.

In addition to identifying the first object, the exemplary method 200 further involves identifying that the movement of the first object is based at least in part upon the movement of a second object in the video, as shown in block 220. For example, in a video editing environment provided by the user interface 23 of the computing device 20 of FIG. 1, a command may have been received from a user to associate the movement of an added object with the movement of an object already in the video. Upon such addition and command, the object analysis component 24 or another component of the video editing environment provided by the computing device 20 may identify that the added object has a movement that is based at least in part upon the movement of the object in the video.

The movement of the object in the video itself may be recognized or approximated in a variety of ways. For example, if the video displays a person walking over the course of multiple frames, various object tracking techniques may be employed to create and/or display one or more representations of the object that provide one or more movement paths of the object. As examples, one or more dots, rectangles, or other shapes may be created and representative positions of the person in the various frames of the video. The editing environment can base the movement of an added object on the path of such representations. As a specific example, the path of a circle added to a video may be based upon a rectangle that represents the movement of a person in the video. The position of the circle in the different frames of the video can be maintained in the same relative position to the center point of that rectangle, for example. Exemplary techniques that may be used to track and provide one or more representations of one or more video objects, e.g., persons, automobiles, animals, etc., are disclosed in U.S. patent application Ser. No. 12/542,120, entitled "Systems and Methods of Tracking Objects in Video," filed concurrently herewith, the entirety of which is incorporated herein by this reference.

As another example, a video editing interface may receive a new object added at a position on a first frame of a video and a command to associate movement of the added object with the movement of a video object, such as a person that is shown walking in the video. In response, keyframe positions for the added object may be determined for subsequent frames preserving the added new object's position relative to the person. Generally, a first object's movement may be based on the movement of a second object's movement in a variety of ways.

The exemplary method 200 further involves determining keyframe values for positions of the first object in a plurality of frames of the video based at least in part on the movement of the second object in the video, as shown in block 230. This can be done in a variety of ways.

For example, FIGS. 3A-E illustrate the movement of an added object in five frames 310, 320, 330, 340, 350 of an exemplary video 300. In this example, the video 300 included an object (not shown) whose motion path through the frames is illustrated by the positions of the rectangle 302 in each of the five frames 310, 320, 330, 340, 350. An added object, circle 304, is added to the first frame 310 of the video 300 and a command is received to have the circle 304 move with the rectangle 306. The circle 304 will be repositioned in each of the other frames 320, 330, 340, 350 of the video so that the relative position between the center 306 of the rectangle 302 and the circle 302 is maintained. This is accomplished in the example by determining keyframe values for each frame 310, 320, 330, 340, 350 of the video specifying the position of the circle 304.

Returning to FIG. 2, the exemplary method 200 further comprises reducing the use of keyframes using an error threshold. In one exemplary embodiment, the position of the first object is specified by keyframe values for some frames of the video, while the positions of the first object for other frames of the video are interpolated from those keyframe values. Generally intermediate keyframes with values that can be interpolated from other keyframes can be identified in a variety of ways.

In one embodiment, the positions of the first object (e.g., an added object) as specified by the determined keyframes are used to determine which keyframes can be eliminated. In the example of FIGS. 3A-E, for example, the five frames 310, 320, 330, 340, 350 may have each been associated with a respective keyframe value A', B', C', D', and E' representing the positions of the circle. The second keyframe value B' can be eliminated (i.e., is not necessary), if, as is the case in FIGS. 3A-C, A' and C' can be used to deduce B'. For example, if the value of B' is equal to the value of A' plus the value of B' divided by 2 (i.e., (A'+C')/2), then B' can be interpolated based on this linear relationship. Non-linear relationships may also be considered. Similarly, if A' and D' can be used to determine B' and C' then both B' and C' can be eliminated.

Each keyframe in a video can be analyzed to eliminate unnecessary ones including, but not limited to, those for which values can be interpolated and need not be separately specified or stored. In the example of FIGS. 3A-3E, it may be determined that A' and D' are not sufficient to interpolate B' and C' and therefore that A' and C' are needed. The keyframe analysis could then proceed to determine whether the value of D' can be interpolated from C' and E', etc. Thus, generally the keyframe analysis can go through keyframes looking for cases where a prior keyframe and a later keyframe can be used to interpolate one or more intermediate values between the prior keyframe and the later keyframe.

This analysis can involve using an error threshold to ensure that the interpolated values will still position the first object close to the positions strictly specified by the relationship between the objections. For example, a keyframe may be eliminated if an interpolated value is within the predefined error threshold of the keyframe's value. In the context of a video editing environment, among others, such an error threshold may provide the benefit of smoothing the motion of the object, which may otherwise result from the association of an object with a representation of an object that tracks the movement of an object. An error threshold may be predefined, automatically determined based on the context, or received as input from a user. Accordingly, in one embodiment a user is able to enter an error threshold. The size of the error threshold may correspond to an amount of smoothing that is applied to the movement of the first object. Accordingly, a user may be able to adjust the amount of smoothing by adjusting the error threshold and/or other settings within an editing environment.

It should also be noted that values in different dimensions (e.g., x,y,z) can be considered independently or in combination, depending on what is appropriate in the particular circumstances and/or to satisfy various user considerations.

In another embodiment, the positions of the second object (e.g., a video object originally in the video as captured) are used to determine which keyframes can be eliminated. Generally, the same techniques as above can be applied to, for example, the positions of the center 306 of the rectangle 302 of FIGS. 3A-E to determine which keyframes can be eliminated because the associated positions can be interpolated from other keyframes. In this embodiment, the keyframe values for the first object (e.g., an added object) need not all be calculated. For example, the rectangle 302 positions in FIGS. 3A-3E could be used to determine that keyframe values need only be determined for frames 310, 330, 350. Accordingly, this embodiment can provide additional computational efficiencies in certain circumstances.

Figure 4:
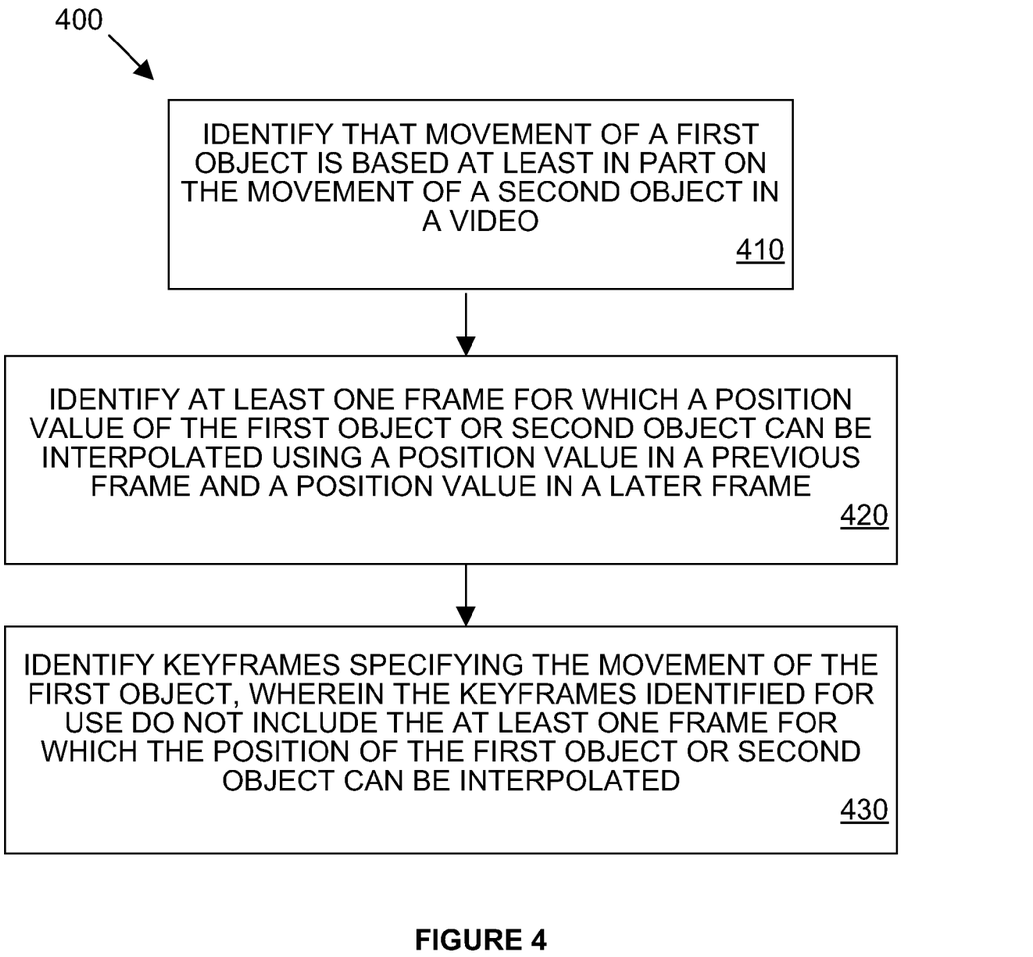
FIG. 4 is a flow chart illustrating another exemplary method of moving objects in a video using keyframes.

FIG. 4 is a flow chart illustrating another exemplary method of moving objects in a video using keyframes. The exemplary method 400 involves identifying that the movement of a first object is based at least in part upon the movement of a second object in a video, as shown in block 410. For example, in a video editing environment provided by the user interface 23 of the computing device 20 of FIG. 1, the movement of a first object may be determined to be associated with the movement of a second object in the video.

The exemplary method 400 further involves identifying at least one frame for which a position value of the first object or a position value of the second object can be interpolated using a position value in a previous frame and a position value in a later frame, as shown in block 420. Intermediate frames with values that can be interpolated from other frames can be identified in a variety of ways. Various types of interpolation can be used including those that generally attempt to identify or construct a function which closely fits the values. Interpolation may involve various curve fitting, regression analysis, and other techniques and may involve the use of an error threshold and/or other settings, as described previously. Generally the keyframe analysis can go through keyframes looking for cases were a first keyframe and a later keyframe can be used to interpolate one or more intermediate values between the first keyframe and the later keyframe.

The exemplary method 400 further involves identifying keyframes specifying the movement of the first object, wherein the keyframes identified for use do not include the at least one frame for which the position of the first object or second object can be interpolated, as illustrated in block 430. Generally, these and other optimization-like techniques can be used to reduce the number of keyframes required and thus provide various benefits in facilitating the association of an added object with a moving object in a video or other electronic content.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, cameras, camcorders, mobile devices, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
    identifying a first object for use in editing a video;
    identifying that movement of the first object is based at least in part on movement of a second object in the video;
    determining, by a processor, a first set of keyframes for positions of the first object in frames of the video based at least in part on the movement of the second object, wherein the first set of keyframes specify a movement of the first object in the video;
    identifying, by the processor, a reduced set of keyframes that specify movement of the first object within an error threshold, wherein the reduced set of keyframes has fewer keyframes than the first set of keyframes, and wherein identifying the reduced set of keyframes comprises eliminating intermediate keyframes having position values that can be interpolated from other keyframes; and
    providing instructions on a computer-readable medium specifying display of the video with the first object on a computing device.

2. The method of claim 1 wherein identifying the reduced set of keyframes further comprises determining that an intermediate keyframe can be eliminated by determining that a position value of the intermediate keyframe for the first object can be interpolated using a prior keyframe value and a later keyframe value.

3. The method of claim 1 wherein identifying the first object and identifying that movement of the first object is based at least in part on movement of the second object comprise:
    identifying the first object as added at a position on a first frame of the video, the first frame displayed in a user interface of a video editing environment; and
    receiving a command in the video editing environment to associate the movement of the first object with the movement of the second object such that the position of the first object in subsequent frames preserves a relative positional relationship between the first object and the second object.

4. The method of claim 1 wherein the second object is a representation associated with a person displayed moving in the video, the representation displayed in a user interface of the video editing environment for use in editing the video.

5. The method of claim 1 wherein identifying the first object comprises identifying the first object as a new object added to a video in a video editing environment.

6. The method of claim 5 wherein identifying that movement of the first object is based at least in part upon movement of a second object in a video comprises receiving a command to associate the movement of the first object with the movement of the second object.

7. The method of claim 6 wherein the video editing environment is part of a content development environment that allows the video to be included in a piece of content.

8. The method of claim 1 wherein the error threshold is received as user input through a user interface of a video editing environment.

9. The method of claim 1 wherein the first object comprises one of a line, a shape, a figure, an image, a photograph, an effect, a video, a container, or a rich Internet application (RIA) object.

10. The method of claim 1 wherein the first object is static.

11. The method of claim 1 wherein content of the first object changes in different frames of the video.

12. The method of claim 1 wherein movement of the first object specified by the reduced set of keyframes is smoother than movement of the first object specified by the first set of keyframes.

13. A non-transitory computer-readable medium on which is encoded program code, the program code comprising:
    program code for identifying a first object for use in editing a video;
    program code for identifying that movement of the first object is based at least in part on movement of a second object in the video;
    program code for determining a first set of keyframes for positions of the first object in frames of the video based at least in part on the movement of the second object, wherein the first set of keyframes specify a movement of the first object in the video;
    program code for identifying a reduced set of keyframes that specify movement of the first object within an error threshold, wherein the reduced set of keyframes has fewer keyframes than the first set of keyframes, and wherein identifying the reduced set of keyframes comprises eliminating intermediate keyframes having position values that can be interpolated from other keyframes; and
    program code for providing instructions on a computer-readable medium specifying display of the video with the first object on a computing device.

* * * * *

UNITED STATES PATENT AND TRADEMARK OFFICE
CERTIFICATE OF CORRECTION

PATENT NO. : 8,717,498 B2  
APPLICATION NO. : 12/542200  
DATED : May 6, 2014  
INVENTOR(S) : Gupta Page 1 of 1

It is certified that error appears in the above-identified patent and that said Letters Patent is hereby corrected as shown below:

On the Title Page:

Item [75]:

delete "Anuji" in inventor Anuj Dhawan's name insert Anuj Dhawan's name to read as follows:

--Anuj Dhawan, Noida (IN)--

Signed and Sealed this  
Fifth Day of August, 2014

Michelle K. Lee  
*Deputy Director of the United States Patent and Trademark Office*